US010274974B2

United States Patent
Jovanovic

(10) Patent No.: US 10,274,974 B2
(45) Date of Patent: Apr. 30, 2019

(54) ENCAPSULATED VALVE WITH LEVER ACTION

(71) Applicant: AFRICAN OXYGEN LIMITED, Selby, Johannesburg, Gauteng (ZA)

(72) Inventor: Radoslav Jovanovic, Johannesburg (ZA)

(73) Assignee: African Oxygen Limited, Johannesburg (ZA)

( * ) Notice: Subject to any disclaimer, the term of this patent is extended or adjusted under 35 U.S.C. 154(b) by 6 days.

(21) Appl. No.: 14/905,683

(22) PCT Filed: Jul. 18, 2014

(86) PCT No.: PCT/IB2014/063212
§ 371 (c)(1),
(2) Date: Jan. 15, 2016

(87) PCT Pub. No.: WO2015/008257
PCT Pub. Date: Jan. 22, 2015

(65) Prior Publication Data
US 2017/0017245 A1 Jan. 19, 2017

(30) Foreign Application Priority Data

Jul. 19, 2013 (ZA) ................. 2013/05482
Sep. 4, 2013 (ZA) ................. 2013/06652

(51) Int. Cl.
*G05D 11/00* (2006.01)
*G05D 16/10* (2006.01)
(Continued)

(52) U.S. Cl.
CPC ....... *G05D 16/10* (2013.01); *F16K 31/52408* (2013.01); *F17C 13/00* (2013.01); *Y10T 137/261* (2015.04)

(58) Field of Classification Search
CPC ........... Y10T 137/2607; Y10T 137/261; Y10T 137/2637; Y10T 137/7826; Y10T 137/783; G05D 16/10; G05D 16/103; G05D 16/106
(Continued)

(56) References Cited

U.S. PATENT DOCUMENTS 1,524,733 A 2/1925 Dick
2,661,577 A 12/1953 Hanson
(Continued)

FOREIGN PATENT DOCUMENTS

EP 0747796 A1 12/1996

OTHER PUBLICATIONS

Notification of Transmittal of the International Search Report Written Opinion of the International Searching Authority, or the Declaration corresponding to International Application No. PCT/IB2014/063212 dated Jan. 29, 2015.
(Continued)

*Primary Examiner* — Robert K Arundale
(74) *Attorney, Agent, or Firm* — Myers Bigel, P.A.

(57) ABSTRACT

Gas regulating means (22), to regulate the flow of gas so as to achieve a desired pressure set by a user, is provided. The gas regulating means (22) is located within a gas flow path between a gas inlet and a gas outlet, characterised in that the gas regulating means (22) comprises an encapsulated valve (24; 410) with a lever (26; 426) that can be actuated by a proximate movable piston arrangement (20). In an embodiment, the encapsulated valve (24, 410) of the gas regulating means (22) comprises a valve body (50; 412) having an inlet side (52; 416) and an outlet side (54; 420), the lever (26; 426) being pivotally fitted at the outlet side (54; 420) with a pivot pin (56; 430), the lever (26; 426) having an actuating cam (66; 432), proximate the pivot pin (56; 430). The encapsulated valve (24, 410) of the gas regulating means (22) comprises a capsule valve pin (68; 434) for abutting against the actuating cam (66; 432) of the lever (26; 426).

10 Claims, 18 Drawing Sheets

(51) Int. Cl.
*F17C 13/00* (2006.01)
*F16K 31/524* (2006.01)

(58) Field of Classification Search
USPC .................................. 251/231, 236, 61, 63.4
See application file for complete search history.

(56) References Cited

U.S. PATENT DOCUMENTS

| | | | |
|---|---|---|---|
| 3,183,935 A | | 5/1965 | Raymond et al. |
| 3,207,175 A | * | 9/1965 | Pauly ................. G05D 16/0694 137/116.5 |
| 3,556,125 A | * | 1/1971 | Dowdall ............... F16K 31/365 137/115.16 |
| 3,971,410 A | * | 7/1976 | St. Clair ............ G05D 16/0694 137/116.5 |
| 7,011,293 B2 | * | 3/2006 | Chien .................... F16K 35/025 251/236 |
| 2009/0173400 A1 | * | 7/2009 | Brandt ................... F16K 15/18 137/511 |

OTHER PUBLICATIONS

International Preliminary Report on Patentability corresponding to International Application No. PCT/IB2014/063212 dated Jan. 28, 2016.

* cited by examiner

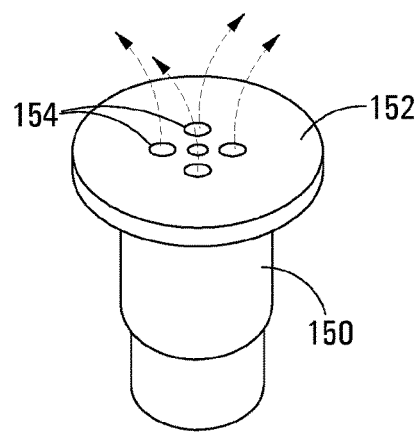
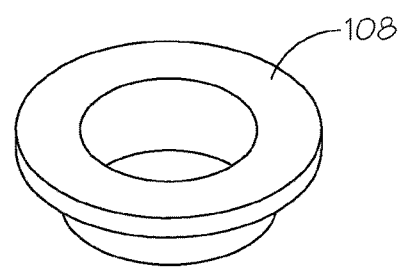
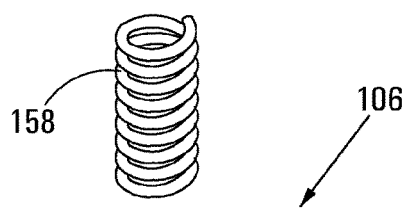
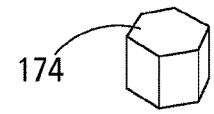
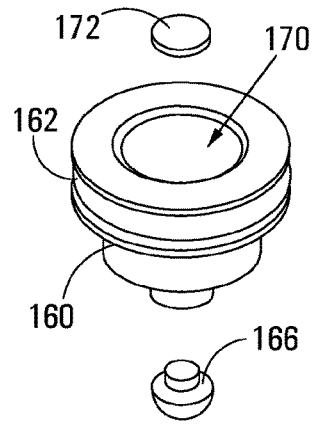
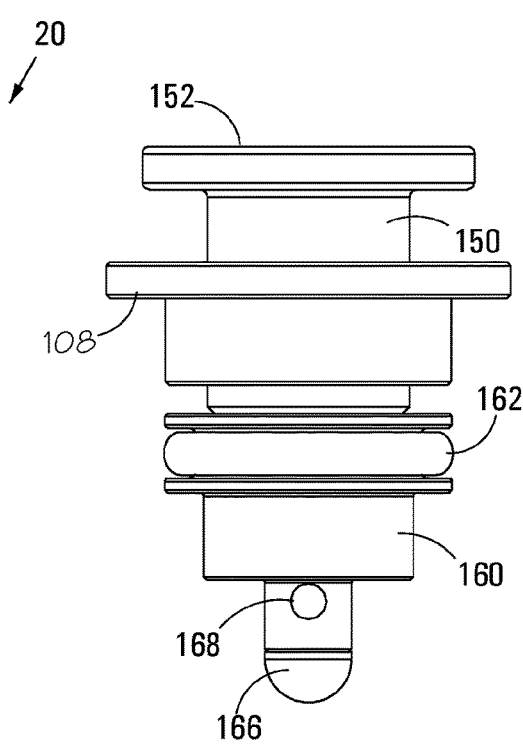
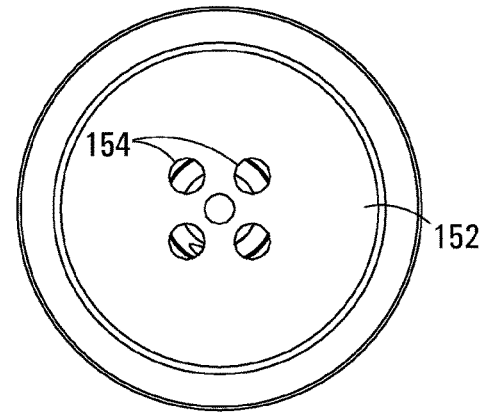
FIG 6A
FIG 6B
FIG 6C

ENCAPSULATED VALVE WITH LEVER ACTION

RELATED APPLICATIONS

This application is a 35 U.S.C. § 371 national phase application of PCT Application PCT/IB2014/063212, filed Jul. 18, 2014 which claims the benefit of South Africa Provisional Patent Application No. 2013/05482, filed Jul. 19, 2013 and South Africa Provisional Patent Application No. 2013/06652, filed Sep. 4, 2013, the entire contents of each of which is incorporated herein by reference.

FIELD OF THE INVENTION

The present invention relates to an encapsulated valve that uses a lever action in its operation. In particular, the encapsulated valve may be used to control the flow of gas in gas pressure regulators and in medical equipment, and upon being actuated, the valve allows gas to enter a gas inlet, flow through the valve and then exit the valve through a gas outlet.

BACKGROUND TO THE INVENTION

Gas pressure regulators are used to provide a substantially continuous supply of gas at a substantially constant selected pressure to a gas outlet upon receiving pressurised gas from a gas source via a gas inlet. Gas pressure regulators are well known, and typically aim to down regulate high pressure gas received from a gas source, such as a loose standing gas cylinder, to a low pressure selected working gas pressure. Regulators typically comprise a gas inlet stem to receive the gas from the source, a regulating means to down regulate the inlet pressure to the desired pressure, and a gas outlet stem to dispense the down regulated gas at the selected desired pressure.

The down regulating means typically comprises a combination of a selecting means for selecting and setting the threshold pressure, and a restricting means for preventing gas exceeding the desired pressure from passing through the regulator from the gas inlet stem to the gas outlet stem. The selecting means and the restricting means typically act in concert in order to achieve the desired gas regulation. Typically, the selecting means includes an adjustable screw received through a housing of the gas regulator which in use actuates against a diaphragm located in an inside chamber of the housing allowing a user to adjust the volume of the chamber. Gas entry from the gas inlet stem into the chamber is controlled via the restricting means, typically a poppet valve. In use, gas enters the inlet stem and enters the chamber via the poppet valve. Should the gas exceed the predetermined threshold the pressure of the gas will close the poppet valve, thus preventing further gas from entering the chamber. The gas inside the chamber can exit through the outlet stem and/or purge valves. As the pressure exerted by the gas inside the chamber drops, the poppet valve opens allowing more gas into the chamber.

Gas regulators can be classified into single-stage and multi-stage regulators. Single stage regulators have a single chamber where regulation of gas pressure takes place, in contrast to multi-stage regulators, which have two or more chambers where regulation of gas pressure takes place.

There are several problems associated with known gas pressure regulators. The diaphragm used in conventional gas regulators is highly specialized, both in regard to its design and material composition. In addition, existing restricting means, such as poppet valves, are difficult to control smoothly so as to operate in a controlled manner.

There is thus a need to provide an encapsulated valve for use in gas pressure regulators and medical equipment that at least partially ameliorates some of the abovementioned problems.

SUMMARY OF THE INVENTION

According to the invention there is provided gas regulating means, to regulate the flow of gas so as to achieve a desired pressure set by a user, the gas regulating means, in use being located within a gas flow path between a gas inlet and a gas outlet, characterised in that the gas regulating means comprises an encapsulated valve with a lever extending from the encapsulated valve, which can be actuated by a proximate movable piston arrangement.

In an embodiment, the encapsulated valve of the gas regulating means comprises a valve body having an inlet side and an outlet side, the lever being pivotally fitted at the outlet side with a pivot pin, the lever having an actuating cam, proximate the pivot pin.

In an embodiment, the encapsulated valve of the gas regulating means comprises a capsule valve pin for abutting against the actuating cam of the lever.

In an embodiment, the valve pin includes a seat to sealingly engage a flow aperture defined in an inner wall within the valve body, the valve pin being movable between a default, closed position in which the lever is not actuated by the movable piston arrangement and in which the seat seals against the flow aperture, so as to prevent the flow of gas through the flow aperture, and an actuated, open position in which the lever is moved by the movable piston arrangement, with the actuating cam moving the valve pin so that the seat moves away from the flow aperture so as to allow the flow of gas through the flow aperture.

In an embodiment, the encapsulated valve includes biasing means to bias the valve pin towards the default, closed position.

In an embodiment, a filter body is fitted to the inlet side of the valve body for filtering the gas flowing through the valve body.

In an embodiment, the biasing means acts between the filter body proximate the inlet side and a seat holder.

In an embodiment, the valve body defines an internal chamber to accommodate the seat holder, the biasing means and the filter body.

In an embodiment, the valve body is substantially elongate, with the lever extending substantially in line with the valve body.

In an embodiment, the valve body is substantially elongate, with the lever extending substantially transversely to the valve body.

BRIEF DESCRIPTION OF THE DRAWINGS

In order that the invention may be better understood, embodiments of the invention will be described below by way of example only and with reference to the accompanying drawings in which:

FIG. 6A shows an exploded perspective view of a piston arrangement used within the gas pressure regulator;

FIG. 6B shows a side view of the piston arrangement in FIG. 6A in an assembled form;

FIG. 6C shows a top view of the piston arrangement in FIG. 6A;

DETAILED DESCRIPTION OF THE DRAWINGS

Figure 1:
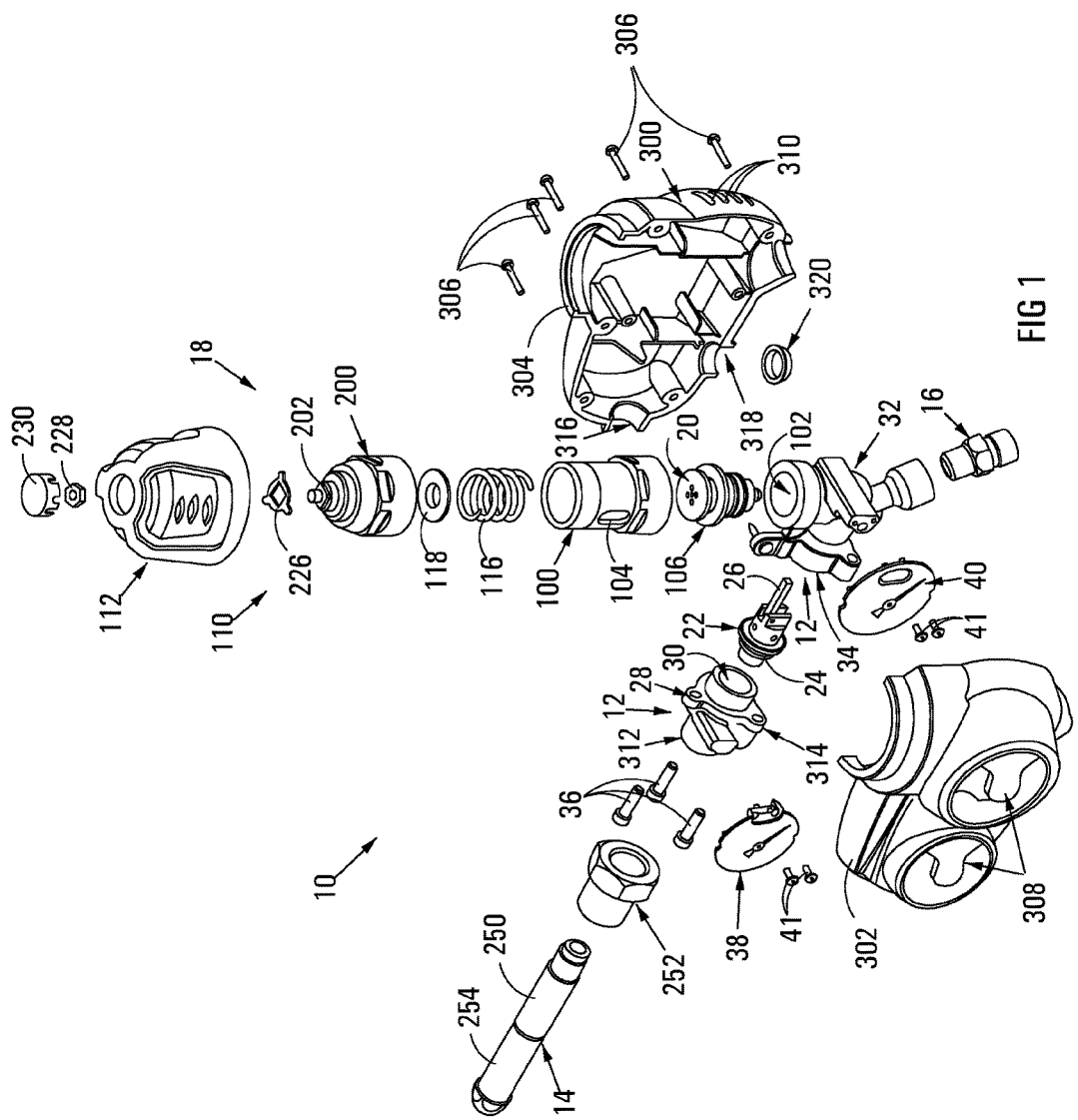
FIG. 1 shows an exploded perspective view of a gas pressure regulator, in which one embodiment of the encapsulated valve of the invention can be used.
Figure 2:
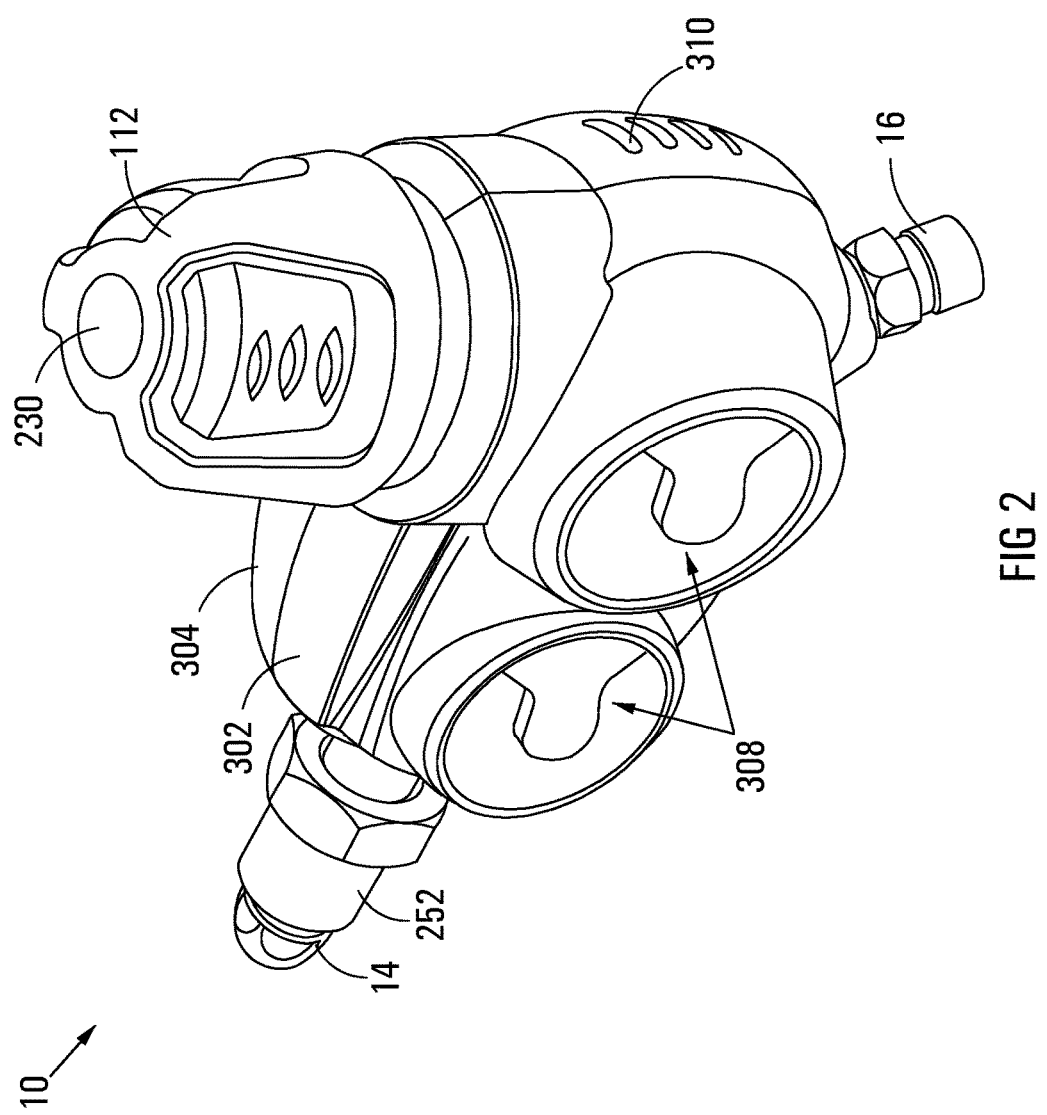
FIG. 2 shows the gas pressure regulator in FIG. 1 in an assembled form.
Figure 3:
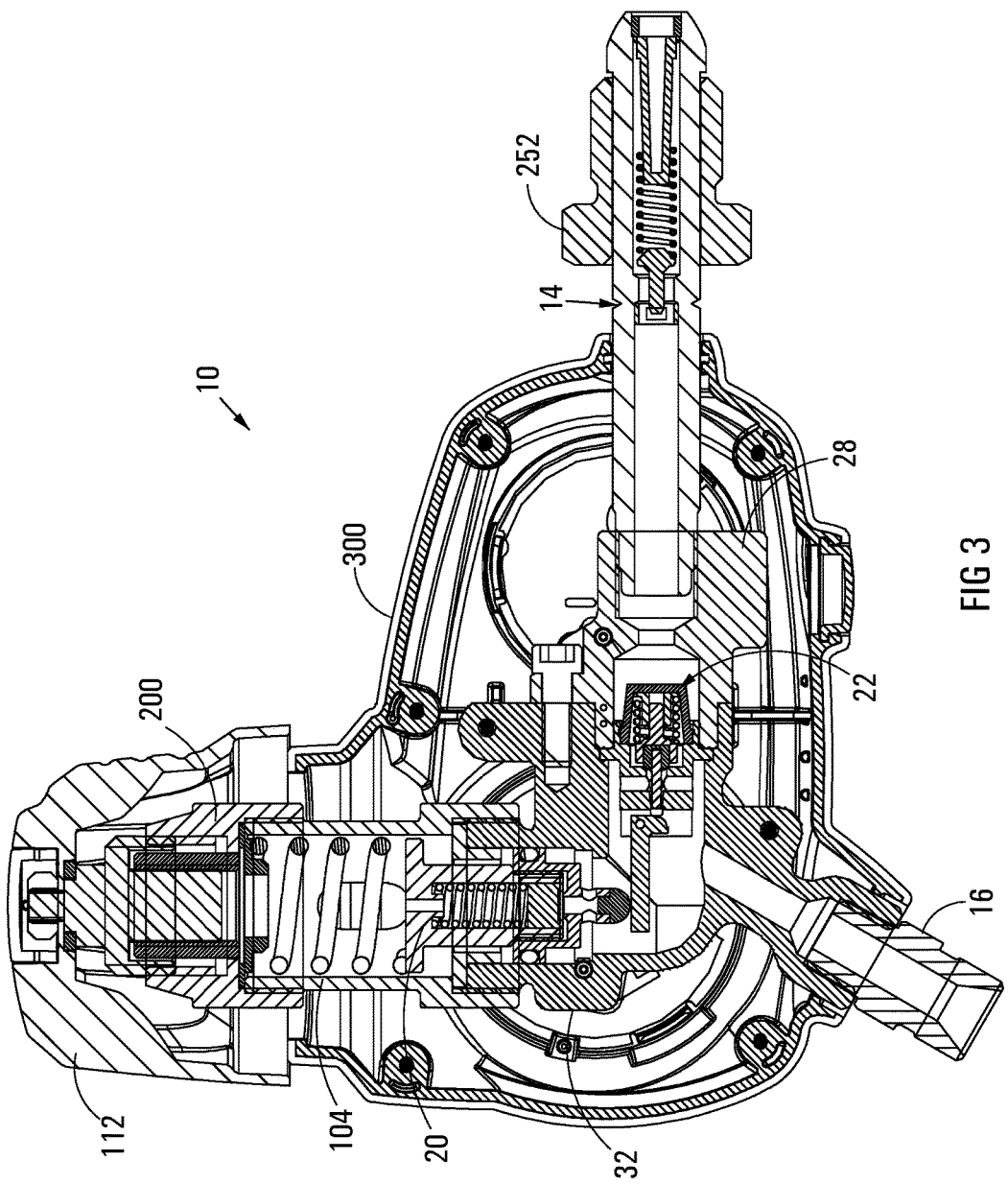
FIG. 3 shows a cross-sectional side view of the gas pressure regulator in FIG. 2.
Figure 4B:
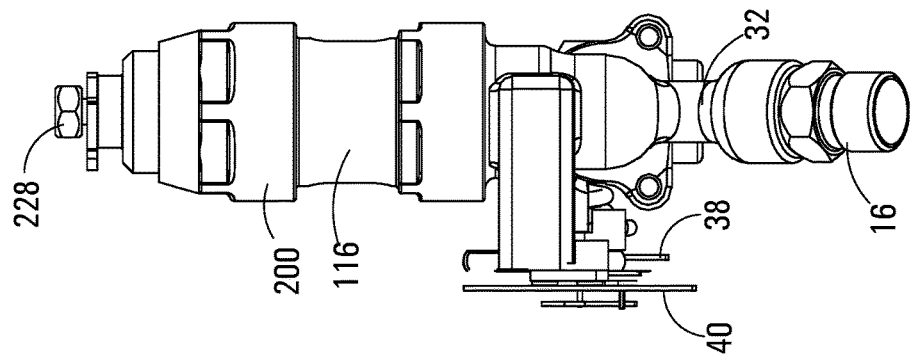
FIG. 4B shows an end view of the gas pressure regulator in FIG. 4A.
Figure 4A:
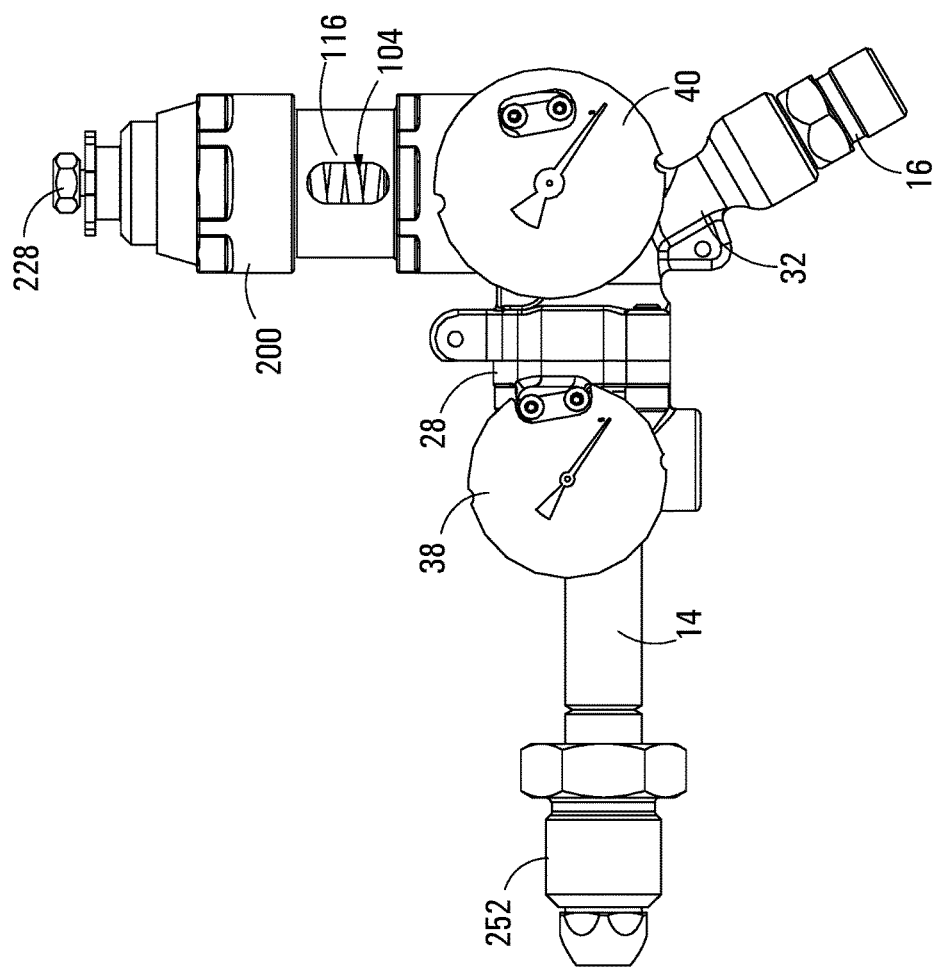
FIG. 4A shows a side view of the internal structure of the gas pressure regulator, with no cladding fitted.

Referring to FIGS. 1, 2, 3, 4A, 4B, 11, 12 and 13, a gas pressure regulator 10 comprises a body 12 fitted with a gas inlet stem 14 at a first end of the body 10, for receiving gas from a gas source at a first, high pressure. A gas outlet stem or adaptor 16 is fitted to a second end of the body 12, for supplying gas at a desired, low pressure through the gas outlet stem 16.

The regulator 10 further comprises a pressure adjusting mechanism 18 to enable a user to adjust and set the desired pressure, the pressure adjusting mechanism 18 comprising a movable piston arrangement 20.

The regulator 10 further comprises gas regulating means 22 to regulate gas flowing out of the gas outlet stem 16 to achieve the desired pressure set by the user. The gas regulating means 22 is securely fitted within the body 12 so as to be located within a gas flow path between the gas inlet stem 14 and the gas outlet stem 16. The gas regulating means 22 comprises an encapsulated valve 24 with a lever 26 that can be actuated by the movable piston arrangement 20 of the pressure adjusting mechanism 18.

In an embodiment, the body 12 includes a first body component 28 to which the gas inlet stem 14 is fitted, the first body component 28 defining an inlet, high pressure chamber 30 for receiving and accommodating gas from the gas source via the gas inlet stem 14. The body 12 further comprises a second body component 32 to which the gas outlet stem 16 is fitted, the second body component 32 defining an outlet, low pressure chamber 34 for delivering gas to the gas outlet stem 16.

The first and second body components 28, 32 are securingly fitted together with screws 36 so as to sealingly secure the encapsulated valve 24 between the first and second body components 28, 32, the encapsulated valve 24 thus defining an interface between the inlet, high pressure and outlet, low pressure chambers 30, 34.

In an embodiment, gas pressure gauges 38, 40 are fitted to the first and second body components 28, 32 with screws 41, and are arranged to measure and visibly display the gas pressure within each of the inlet and outlet chambers 30, 34, respectively. This provides a measure of the gas pressure at the gas inlet and outlet stems 14, 16, which measure can be visually inspected.

Figure 5A:
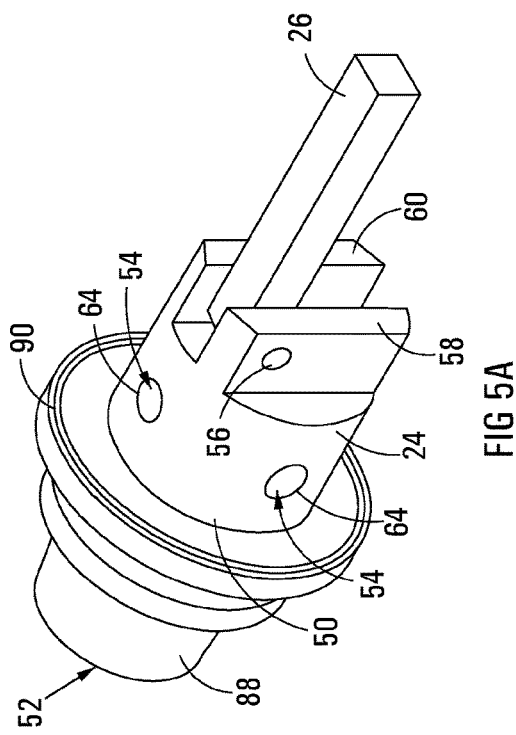
FIG. 5A shows a perspective view of an encapsulated valve used within the gas pressure regulator, according to a first aspect of the invention, the valve being shown in a closed position.
Figure 5C:
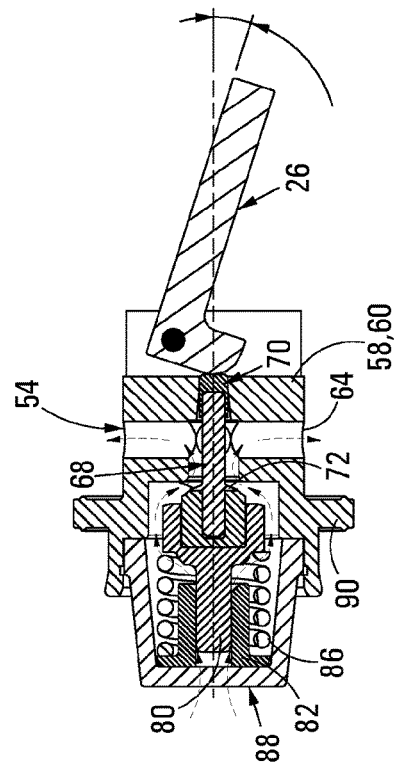
FIG. 5C shows a cross-sectional side view of the encapsulated valve in an open position.
Figure 5B:
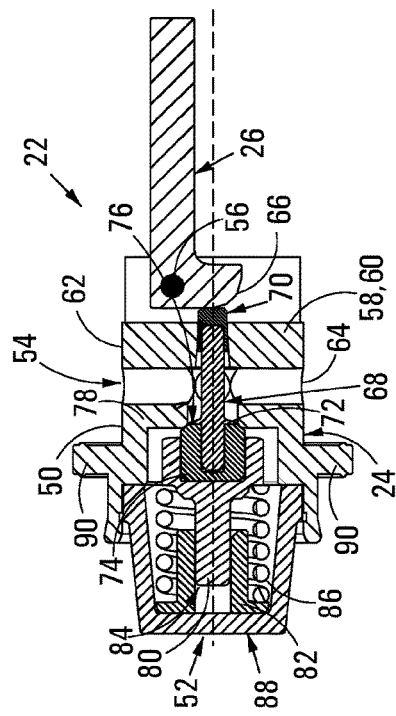
FIG. 5B shows a cross-sectional side view of the encapsulated valve in FIG. 5A.
Figure 7A:
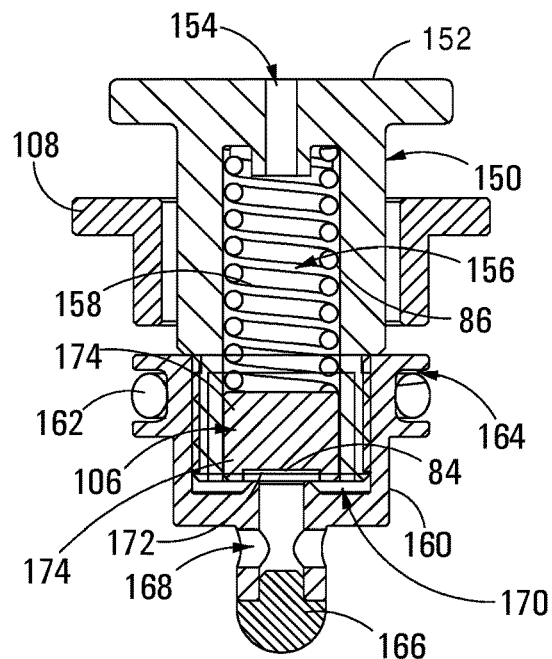
FIG. 7A shows a cross-sectional side view of the piston arrangement in FIGS. 6A and 6B, the piston arrangement being shown in a default closed position.
Figure 7B:
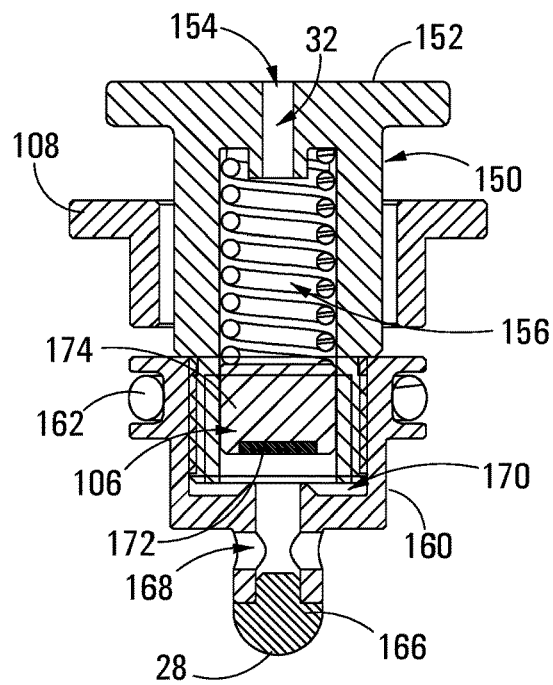
FIG. 7B shows a cross-sectional side view of the piston arrangement in FIGS. 6A and 6B, the piston arrangement being shown in a venting, open position.
Figure 8:
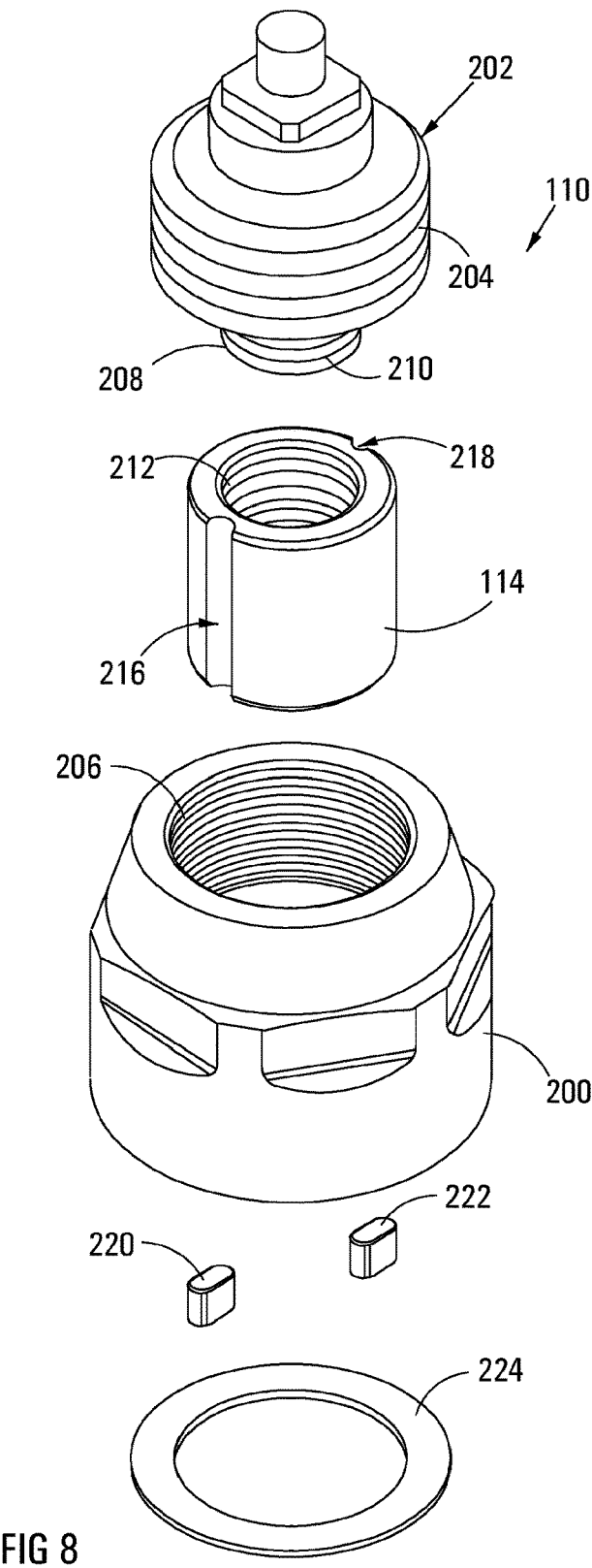
FIG. 8 shows an exploded perspective view of a pressure adjusting assembly used within the gas pressure regulator.

Turning now to FIGS. 5A, 5B and 5C, the encapsulated valve 24 of the gas regulating means 22 comprises a valve body 50 having an inlet side 52 and an outlet side 54. The lever 26 is pivotally fitted at the outlet side 54 with a pivot pin 56, the lever 26 being positioned between two spaced apart walls 58, 60. A cylindrical wall 62, from which the spaced apart walls 58, 60 extend, defines a plurality of apertures 64 for allowing gas to exit the valve body 50 (as shown by the arrows in FIG. 5C). The lever 26 has an actuating cam 66 proximate the pivot pin 56.

The encapsulated valve 24 further comprises a capsule valve pin 68, terminating at one end with a friction cap 70, for abutting against the actuating cam 66 of the lever 26. The valve pin 68 further includes a seat 72 (and associated seat holder 74) to sealingly engage a flow aperture 76 defined in an inner wall 78 within the valve body 50. The valve pin 68 is movable between a default, closed position (shown in FIGS. 5A and 5B) and an actuated, open position (shown in FIG. 5C).

In the default, closed position, the lever 26 is not actuated by the movable piston arrangement 20 of the pressure adjusting mechanism 18. The seat 72 thus seals against the flow aperture 76 so as to prevent the flow of gas through the flow aperture 76.

In the actuated, open position, the lever 26 is moved by the movable piston arrangement 20 of the pressure adjusting mechanism 18, with the actuating cam 66 accordingly moving the valve pin 68 so that the seat 72 moves away from the flow aperture 76 so as to allow the flow of gas through the flow aperture 76.

A holder 80 is provided to accommodate the seat 72 of the valve pin 68; in particular, the holder 80 securely holds the seat holder 74.

The encapsulated valve 24 further comprises a guide 82 to define a channel 84 for slidingly accommodating the holder 80, and to control the movement of the valve pin 68 between the open and closed positions. Biasing means 86, in the form of a spring, biases the valve pin 68 towards the default, closed position.

In an embodiment, a conical filter body 88 is fitted to the inlet side 52 of the valve body 50, for filtering the gas flowing through the valve body 50, with the filter body 88 housing the guide 82 and the biasing means 86.

In an embodiment, the valve body 50 is substantially elongate, with the lever 26 extending substantially in line with the valve body 50.

Figure 11:
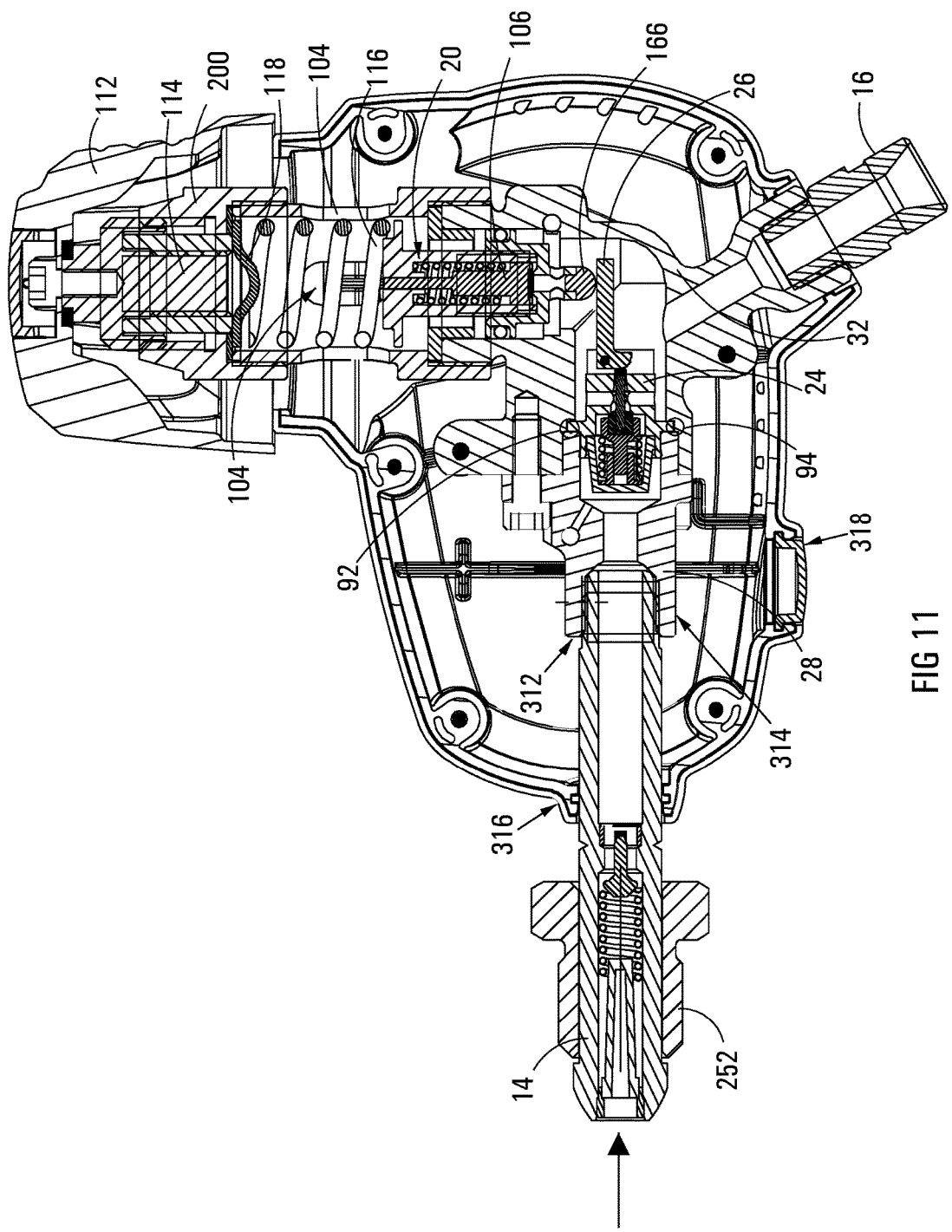
FIG. 11 shows a cross-sectional side view of the gas pressure regulator in a closed position.

In an embodiment, the body 50 of the encapsulated valve 24 defines a circular flange 90, which gets sandwiched between complementary stepped formations defined in the first and second body components 28, 32, as indicated by circled zones 92 and 94 in FIG. 11.

Figure 16:
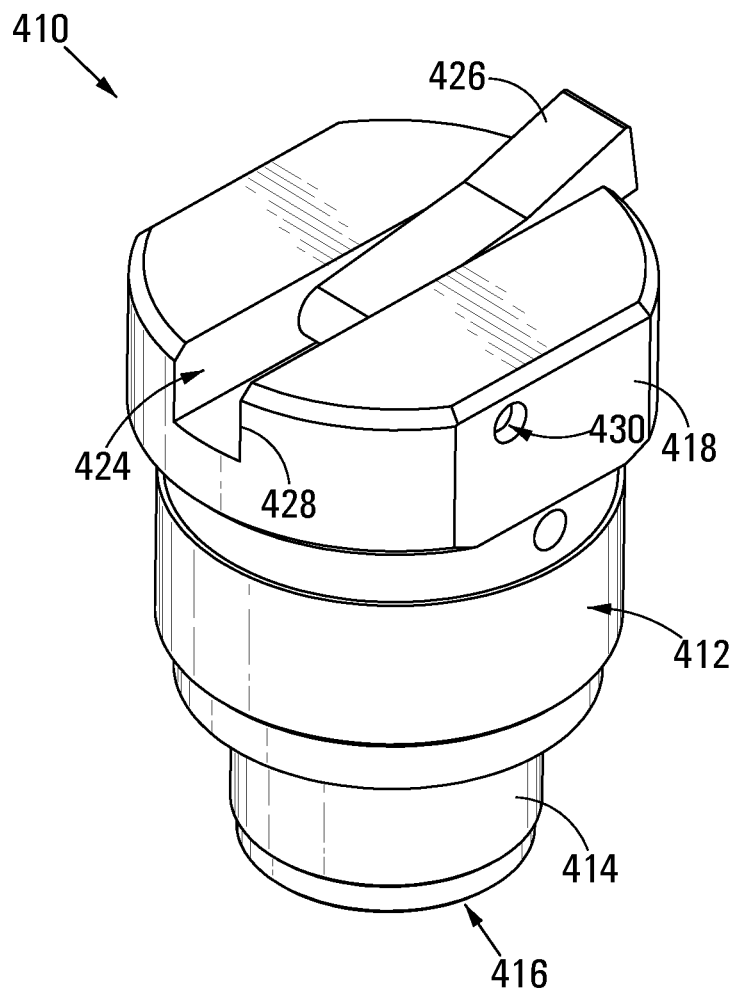
FIG. 16 shows a perspective view of an encapsulated valve, according to a second aspect of the invention.

An alternate version of the encapsulated valve will now be described with reference to FIGS. 16 to 18. An encapsulated valve 410 comprises a valve body 412 having a lower valve body 414 that defines an inlet 416 and an upper valve body 418 that defines an outlet 420.

The lower valve body 414 defines a chamber 422 for accommodating a number of components, as will become clearer further on in the specification. The upper valve body 418 includes an elongate recess 424 for accommodating a lever 426. A side wall 428 adjacent the recess 424 is fitted with a pin 430 to enable the lever 426 to be pivotally fitted proximate the outlet 420.

The lever 426 defines an actuating face 432 proximate the pivot pin 430. The lever 426 can be actuated by an adjacent piston arrangement (not shown) so as to move the valve 410 between closed and opened positions (as shown in FIGS. 17 and 18, respectively).

The encapsulated valve 410 further comprises a capsule valve pin 434 for abutting against the actuating face 432 of the lever 426. The valve pin 434 further includes a seat 436 to sealingly engage a flow aperture 440 defined in an inner wall within the valve body 414. The seat 436 is held in place with a seat holder 438.

Figure 17:
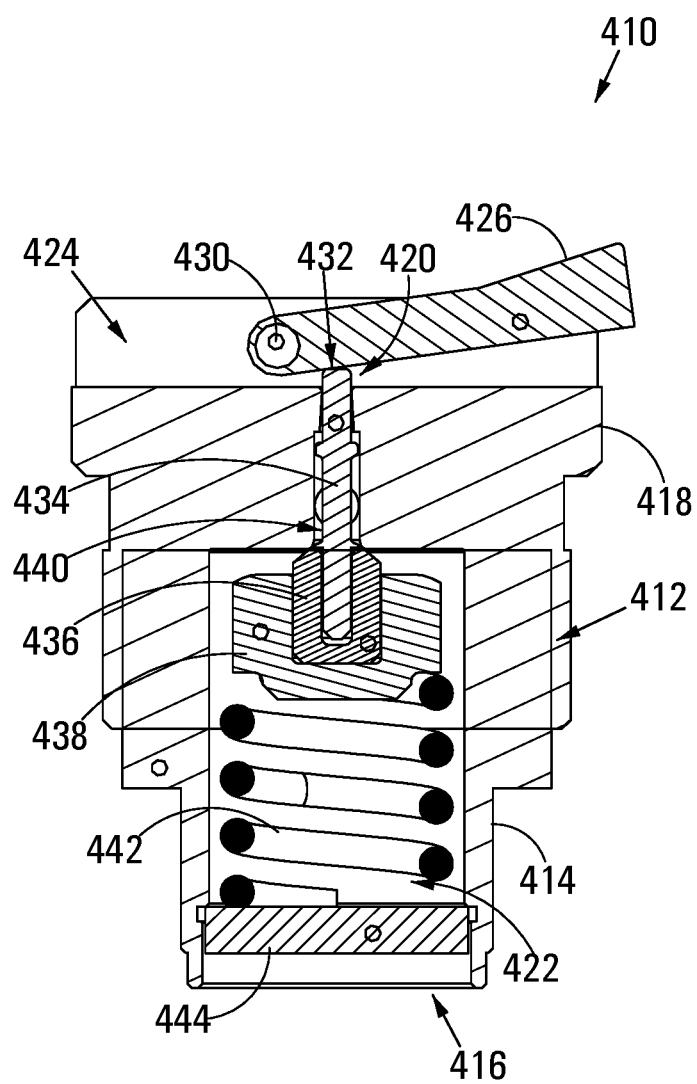
FIG. 17 shows a cross-sectional side view of the encapsulated valve in FIG. 16, the valve being shown in a closed position.
Figure 18:
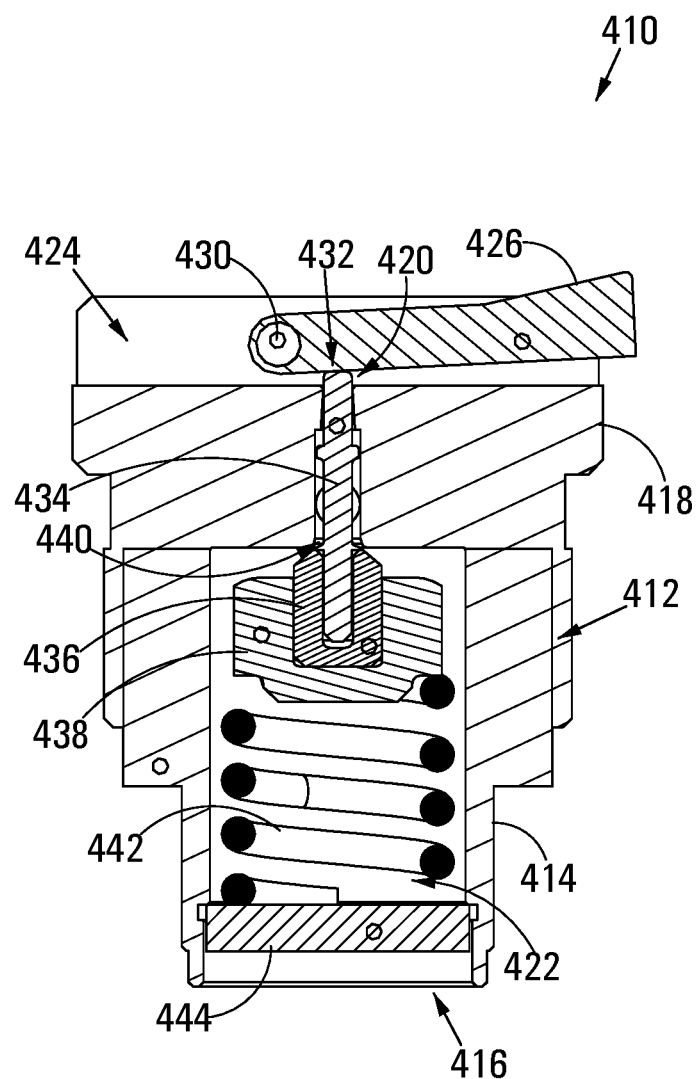
FIG. 18 shows a cross-sectional side view of the encapsulated valve in FIG. 16 in an open position.

As best shown in FIGS. 17 and 18, valve pin 434 is movable between a default, closed position and an actuated, opened position. In the default, closed position, as best shown in FIG. 17, the lever 426 is not actuated by the piston arrangement. Thus, the seat 436 seals against the flow aperture 440 so as to prevent the flow of gas through the flow aperture 440. In the actuated, opened position, as best shown in FIG. 18, the lever 426 is moved by the piston arrangement so that the actuating face 432 moves the valve pin 434. This causes the seat 436 to move away from the flow aperture 440 so as to allow the flow of gas through the flow aperture 440.

The encapsulated valve 410 comprises biasing means 442, typically in the form of a coil spring, to bias the valve pin 434, via the seat holder 438 and seat 436, towards the default, closed position. The biasing means 442 acts between the seat holder 438 and a filter body 444 that is positioned proximate the inlet 416. In an embodiment, a filter body 444 is fitted to the inlet 416 of the valve body 412, for filtering the gas flowing through the valve body 412.

In an embodiment, the chamber 422 accommodates the seat holder 438, the seat 436, the biasing means 442 and the filter body 444.

In an embodiment, the valve body 412 is substantially elongate, with the lever 426 extending substantially transversely to the valve body 412.

Referring back to FIGS. 1, 2, 3, 4A, 4B, 11, 12 and 13, the pressure adjusting mechanism 18 comprises a venting sleeve 100 extending from a venting outlet 102 defined in the second body component 32. The venting sleeve 100 is in gas communication with the outlet chamber 34 of the second body component 32. The venting sleeve 100 defines at least one venting aperture 104, but typically two, to enable gas to vent if/when required.

With reference now also to FIGS. 6A, 6B, 6C, 7A and 7B, the piston arrangement 20 incorporates a safety valve assembly 106, which will be described further below. The piston arrangement 20 is housed partially within the venting sleeve 100 and partially within the venting outlet 102 defined in the second body component 32. The piston arrangement 20 comprises a guide flange 108 which is secured in place, typically by being sandwiched between the venting sleeve 100 and the second body component 32. The piston arrangement 20 is thus slidably movable relative to the guide flange 108 between the open and closed positions, so as to actuate or not actuate the lever 26, respectively.

Figure 9A:
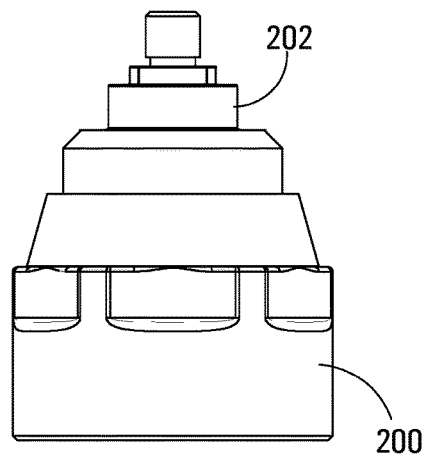
FIG. 9A shows a side view of the pressure adjusting assembly in FIG. 8, assembled and in a raised, closed position.
Figure 9B:
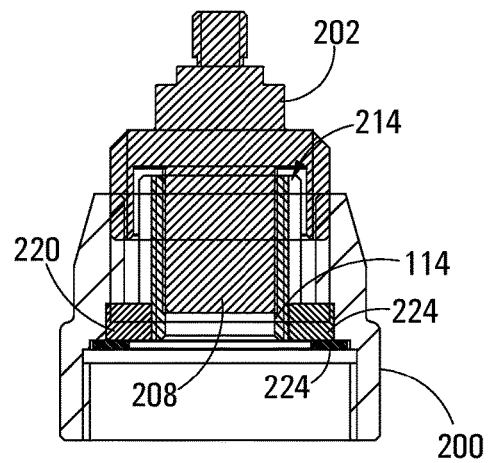
FIG. 9B shows a cross-sectional side view of the pressure adjusting assembly in FIG. 9A.
Figure 9C:
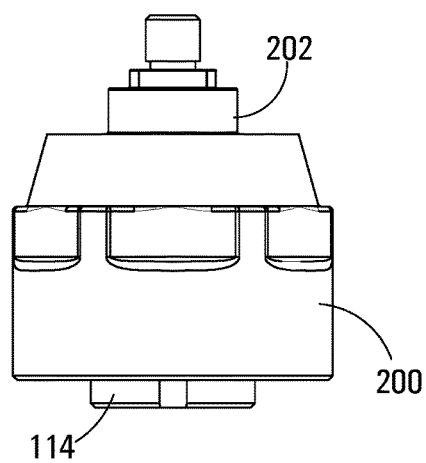
FIG. 9C shows a side view of the pressure adjusting assembly in FIG. 8, assembled and in a lowered, open position.
Figure 9D:
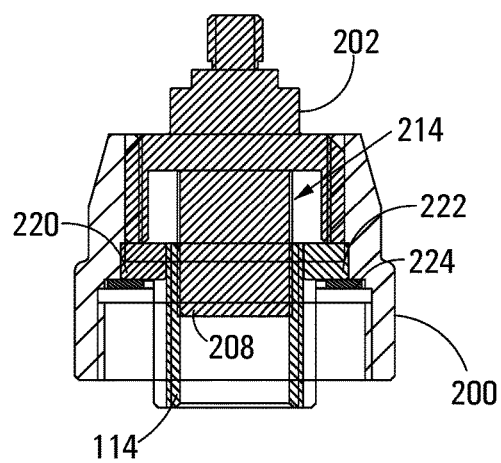
FIG. 9D shows a cross-sectional side view of the pressure adjusting assembly in FIG. 9C.

The pressure adjusting mechanism 18 further comprises a pressure adjusting assembly 110 that can be manually operated by a user to adjust and set the desired pressure. The pressure adjusting assembly 110 in turn comprises a rotatable knob 112 to actuate a movable spindle 114 (shown in FIGS. 9B, 9C and 9D), which in turn actuates a biasing means 116, in the form of a spring, via an intermediate spring plate 118, within the venting sleeve 100, which in turn actuates the piston arrangement 20.

Turning back to FIGS. 6A, 6B, 6C, 7A and 7B, the piston arrangement 20 comprises a first piston body 150 including a safety valve head 152. The safety valve head 152 defines at least one vent outlet 154, with the first piston body 150 including an internal cavity 156 to accommodate biasing means 158, in the form of a spring. The internal cavity 156 is in gas communication with the vent outlet 154 to enable gas to escape from the first piston body 150.

The piston arrangement 20 further comprises a second piston body 160 extending from (and typically fixed to) the first piston body 150. The first and second piston bodies 150, 160 move in concert relative to the guide flange 108, with the second piston body 160 being sealingly movable within the venting outlet 102 defined in the second body component 32. An O-ring 162 is located within a peripheral recess 164 to maintain this seal. The O-ring 162 effectively replaces the function of the diaphragm in known gas pressure regulators, and its robust structure and operation is ideally suited for this.

The second piston body 160 terminates in a friction pin 166 to actuate the lever 26 of the encapsulated valve 24. The second piston body 160 defines a vent inlet 168 and an adjacent internal cavity 170 that is in gas communication with the cavity 156 of the first piston body 150.

Thus, in use, the piston arrangement 20, and the first and second piston bodies 150, 160 in particular, are slidably movable relative to the guide flange 108 between the open and closed positions (to actuate or not actuate the lever 26, respectively).

In an embodiment, the second piston body 160 includes the safety valve assembly 106, the safety valve assembly 106 comprising a valve seat 172 and associated seat holder 174 located within the internal cavity 170. The biasing means 158 is arranged to act upon the seat holder 174, and thus the valve seat 172, to close the vent inlet 168, thereby preventing gas from entering the piston arrangement 20 (under closed and normal operating conditions, with reference to FIGS. 11 and 13, respectively). However, under sufficiently high pressures within the outlet chamber 34, with reference to FIG. 12, the piston assembly is pushed upwardly (i.e. the first and second piston bodies 150, 160 move up relative to the guide flange 108, against the bias of the spring 116) and the valve seat 172 is displaced away from the vent inlet 168 (against the bias of the spring 158) to allow gas to flow through the vent inlet 168, through the internal cavities 156, 170, and through the vent outlet 154 so as to safely escape out of the gas pressure regulator 10, as shown by arrows 176.

Turning now to FIGS. 8, 9A, 9B, 9C and 9D in more detail, the pressure adjusting assembly 110 comprises a body 200 to threadably accommodate a driving member 202. The rotatable knob 112 is fitted to the driving member 202 so as to threadably rotate and move the driving member 202 through the body 200. The driving member 202 has a central enlarged portion 204 that is threaded to match the threading 206 of the body 200, and a terminal narrowed portion 208 that is threaded 210 to enable it to be threadably accommodated within the movable spindle 114. The movable spindle 114 comprises a sleeve to define an internal thread 212 to match the threading 210 provided on the terminal narrowed portion 208 of the driving member 202. The central enlarged portion 204 defines an internal circular recess 214 to accommodate the movable spindle 114 as the spindle 114 threadably rotates relative to the driving member 202.

In an embodiment, the movable spindle 114 defines a pair of elongate recesses 216, 218 on the outside surface of the spindle 114, with a pair of guide pins 220, 222 being fitted within the body 200 to slidingly accommodate and guide the spindle 114 as it moves relative to the body 200.

A pin retainer plate 224 is provided to secure the guide pins 220, 222 in place within the body 200. The rotatable knob 112 is fitted to the driving member 202 via torque plate 226 that is secured in place by means of a nut 228 secured to the driving member. A tamper proof knob cap 230 is fitted to the knob 112.

This double threaded arrangement (i.e. the thread on portion 204 engaging the thread 206 and the thread 210 engaging the thread 212) of the pressure adjusting assembly 110 allows a relatively greater displacement of the spindle 114, with relatively fewer turns. In an embodiment, the maximum open setting may be achieved in just two turns of the knob 112.

Figure 10A:
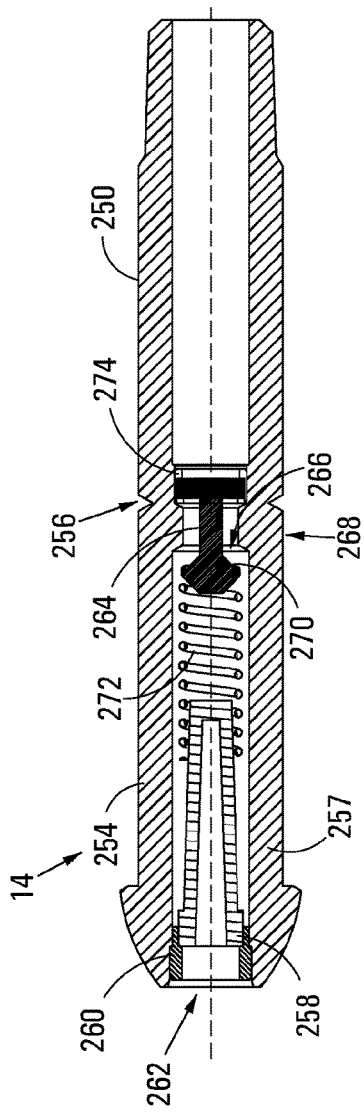
FIG. 10A shows a cross-sectional side view of an inlet stem used in conjunction with the gas pressure regulator, the inlet stem comprising a first inlet stem member and a second inlet stem member.
Figure 10B:
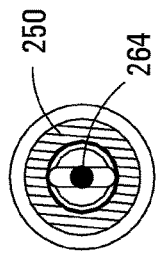
FIG. 10B shows a cross-sectional end view of the inlet stem in FIG. 10A, taken along line C-C in FIG. 10A.
Figure 10C:
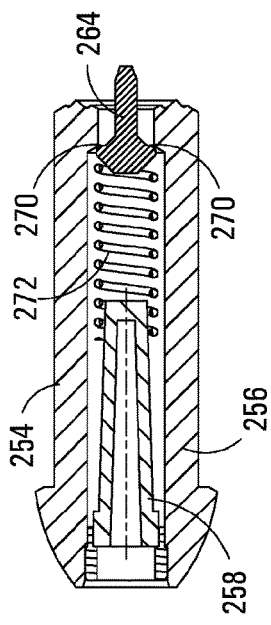
FIG. 10C shows a cross-sectional side view of the second inlet stem member after it snaps off the first inlet stem member.

Turning now to FIGS. 10A, 10B and 10C, the inlet stem 14 comprises a first inlet stem member 250, which is fitted to the first body component 28. A stem nut 252, as shown in FIG. 1, for example, is carried on the inlet stem 14 to facilitate securement to the gas source. The inlet stem 14 further comprises a second inlet stem member 254, which can be secured to the gas source, with a frangible zone of weakness 256 being defined between the first and second inlet stem members 250, 254.

In an embodiment, the second inlet stem member 254 comprises a sleeve 257 including a frusto-conical filter 258, which is secured in position with a retainer 260. The filter 258 is positioned at a first end 262 of the second inlet stem member 254, proximate the gas source. A valve spigot 264 extends through an aperture 266 defined at a second end 268 of the second inlet stem member 254 proximate the first inlet stem member 250, the valve spigot 264 including a seat 270 to seat against the aperture 266 so as to prevent the flow of gas therethrough. Biasing means 272, in the form of a spring, is provided to bias the valve spigot 264 into a closed position in which gas is prevented from flowing through the aperture 266.

In an embodiment, the first inlet stem member 250, is fitted with a retainer 274 against which the end of the valve spigot 264 presses, so that when the inlet stem 14 is intact, the retainer 274 pushes the valve spigot 264 away from the aperture 266, thereby allowing gas flow therethrough. However, when the inlet stem (250) severs proximate the frangible zone of weakness (256), the biasing means 272 pushes the valve spigot 264 so as to close the aperture 266, thereby preventing the flow of gas from the gas source.

As best shown in FIG. 1, the gas pressure regulator 10 is fitted with protective cladding 300 to house the body 12. The cladding 300 comprises a pair of housing halves 302, 304 that can be secured together with tamper proof screws 306, the cladding 300 being fabricated from impact resistant and fire retardant material (e.g. Nylon), which is splash and dust resistant, light and low maintenance.

One of the cladding halves comprises a pair of visual inspection windows 308 to enable a user to read the information on the pressure gauges 38, 40, the inspection windows 308 being substantially flush with the cladding 300. This ensures a slim design, thus preventing accidental damage to the gauges 38, 40.

In an embodiment, the cladding 300 defines a plurality of venting apertures 310 to enable gas to leave the venting sleeve 100, especially after the operation of the safety valve assembly 106, to escape to atmosphere.

The illustrated version shows a side inlet entry version of the regulator 10. However, in an alternate version, a bottom inlet entry version is possible, and to achieve both possibilities, the first body component 28 defines two inlet opening 312, 314. The cladding 300, accordingly, defines two apertures 316, 318. Thus, in the illustrated side inlet entry version, in which the inlet stem 14 is secured to the opening 312, the aperture 318 in the cladding is fitted with a plug 320. Conversely, in the bottom inlet entry version, a similar plug would be used to plug the aperture 316 in the cladding 300.

Figure 12:
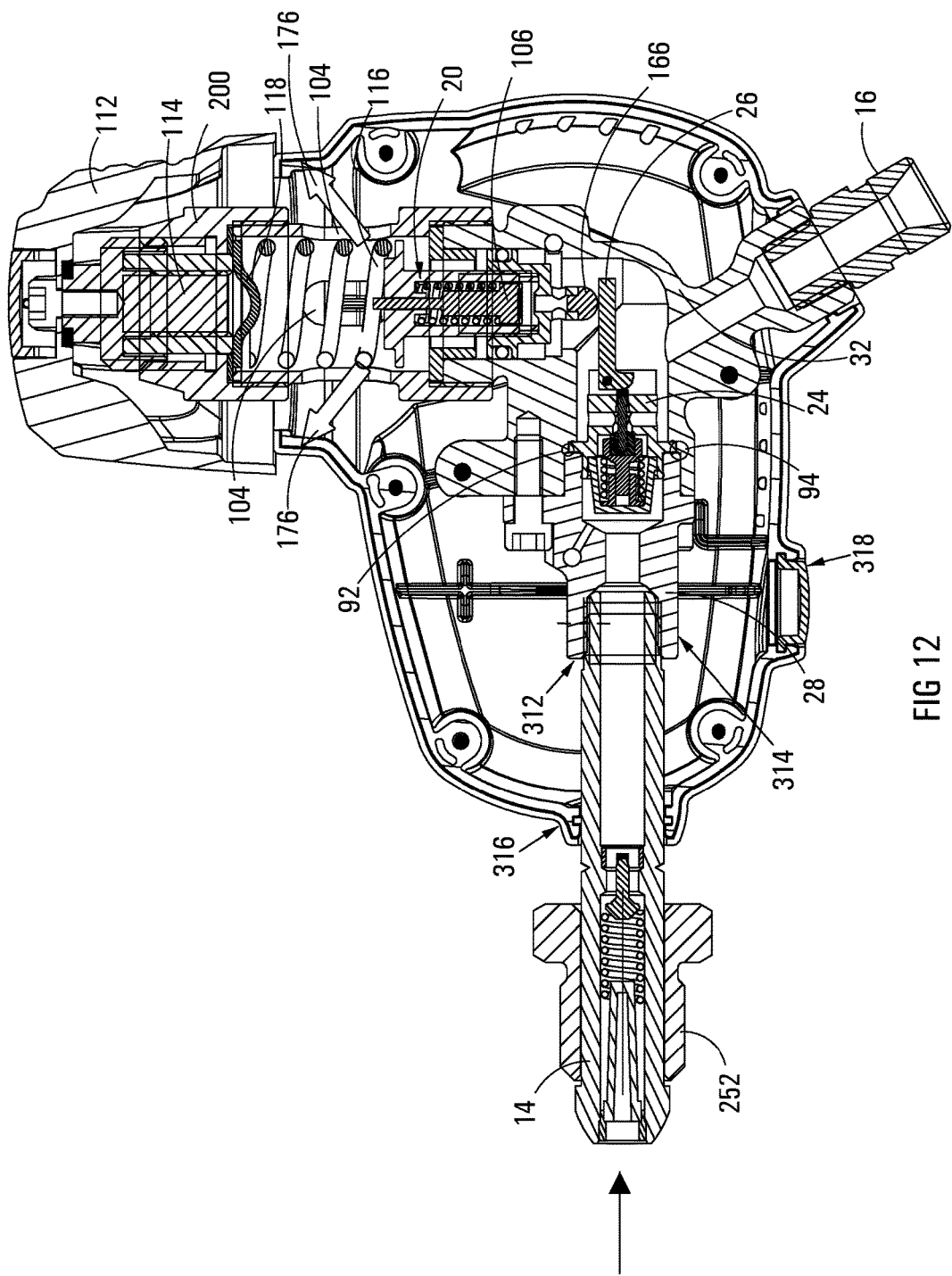
FIG. 12 shows a cross-sectional side view of the gas pressure regulator in a venting position.
Figure 13:
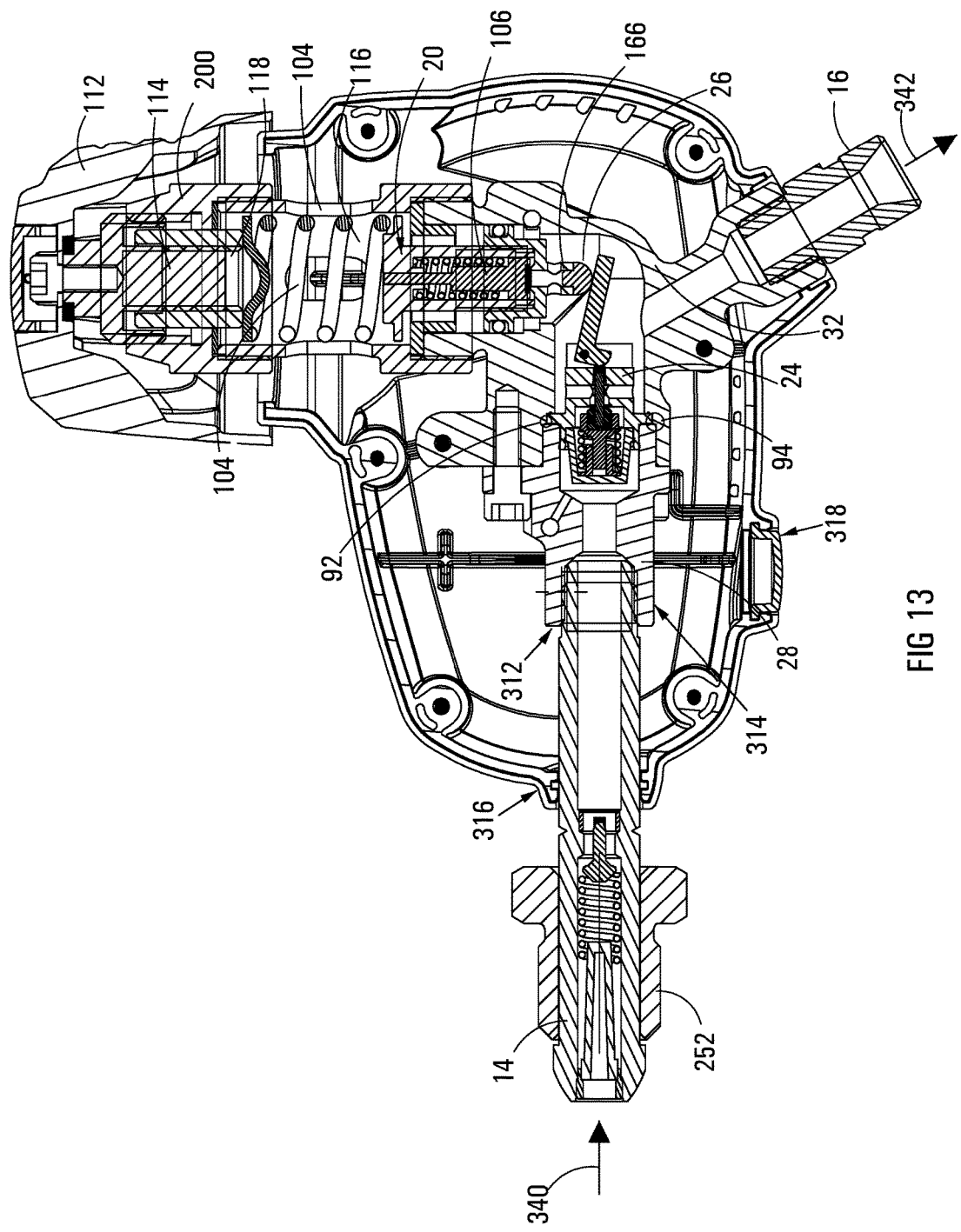
FIG. 13 shows a cross-sectional side view of the gas pressure regulator in a normal regulating position.

Thus, when not in use (i.e. when closed, as shown in FIG. 11), the lever 26 is not actuated, and thus the encapsulated valve 24 is closed, thereby preventing the flow of gas through the regulator 10. However, during normal use, as shown in FIG. 13, in which a user rotates the knob 112 so as to move the spindle 114 downwardly, and thus the piston arrangement 20 downwardly as well, so as to actuate the lever 26, this opens the encapsulated valve 24 so as to allow the flow of gas therethrough. Thus, incoming high pressure gas enters the inlet stem 14 (as shown by arrow 340) with low pressure gas then exiting the outlet stem/adaptor 16 (as shown by arrow 342). However, during an emergency, as shown in FIG. 12, in which gas needs to vent rapidly out of the regulator 10, the valve seat 172 is forced to move away from the vent inlet 168, thus allowing gas to enter the piston arrangement 20 and then escape out of the regulator 10 via the venting sleeve 100.

Figure 14:
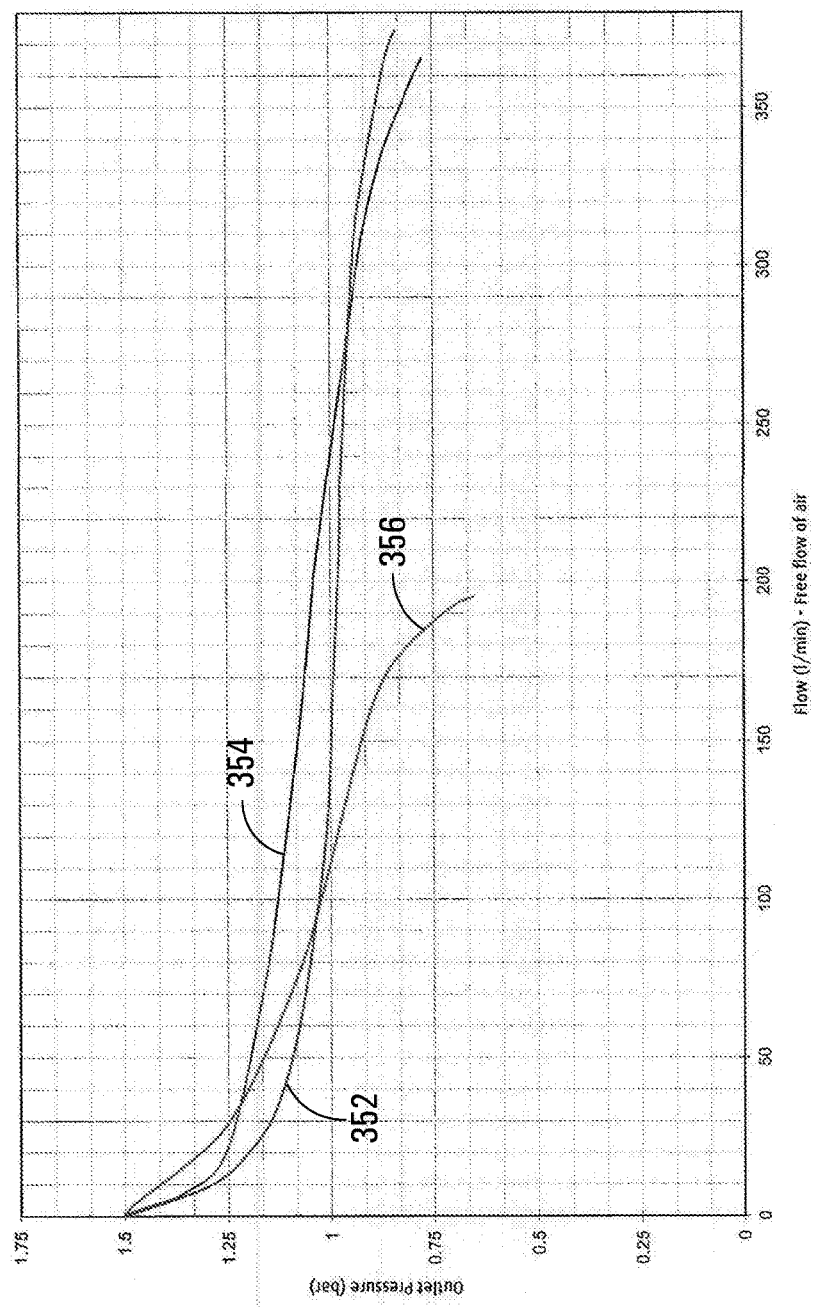
FIG. 14 shows a graph of the performance of a 1.5 bar pressure regulator for delivering acetylene, across a range of inlet pressures.

Finally, FIG. 14 shows a graph 350 of the performance of the 1.5 bar pressure regulator for delivering acetylene, in which 352 shows the performance of the regulator at 25 bar, 354 at 15 bar, and 356 at 4 bar.

Figure 15:
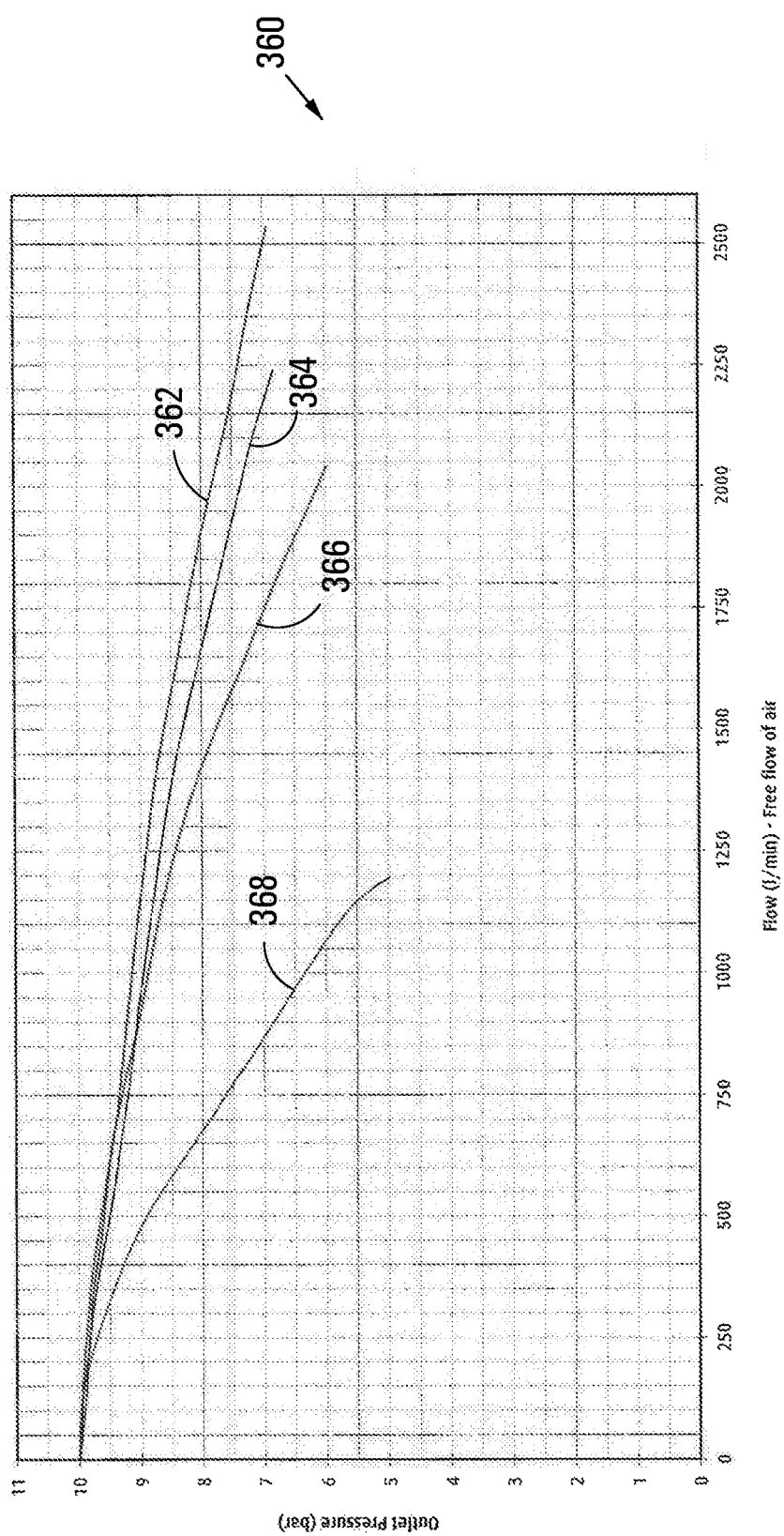
FIG. 15 shows a graph of the performance of a 10 bar pressure regulator for delivering oxygen, across a range of inlet pressures.

Similarly, FIG. 15 shows a graph 360 of the performance of the 10 bar pressure regulator for delivering oxygen, in which 362 shows the performance of the regulator at 200 bar, 364 at 100 bar, 366 at 50 bar and 368 at 21 bar.

The present invention clearly has a number of advantageous features, but in general terms, the interaction between the inlet and outlet chambers and the piston arrangement and encapsulated valve enables the pressure to be regulated in stages, thereby minimizing pressure fluctuations so as to mimic a multi-stage regulator. The lever arrangement used in the encapsulated valve of the present invention provides better and more accurate flow characteristics when compared to existing medical integrated valves, partially because it requires less force to operate.

The invention claimed is:

1. Gas regulating means, to regulate the flow of gas so as to achieve a desired pressure set by a user, the gas regulating means, in use being located within a gas flow path between a gas inlet and a gas outlet, wherein the gas regulating means comprises:
   an encapsulated valve comprising a valve body and a capsule valve pin, the valve body having an inlet side and an outlet side and defining a flow aperture within the valve body, and the capsule valve pin is within the valve body between the inlet side and the outlet side of the valve body and includes a seat to sealingly engage the flow aperture; and
   the encapsulated valve receiving a portion of a lever, the lever being pivotally fitted to the encapsulated valve at the outlet side of the encapsulated valve with a pivot pin, and wherein the portion of the lever that is received in the encapsulated valve having an actuating cam that is proximate the pivot pin and abuts against the capsule valve pin, wherein the lever is arranged to be actuated by a proximate movable piston arrangement between a default position in which the valve pin is at a default, closed position and in which the seat seals against the flow aperture, so as to prevent the flow of gas through the flow aperture, and an actuated position in which the lever displaces the valve pin to an open position with the actuating cam of the lever pushing the valve pin so that the seat moves away from the flow aperture so as to allow the flow of gas through the flow aperture.

2. Gas regulating means of claim 1, wherein the flow aperture is defined in an inner wall within the valve body.

3. Gas regulating means of claim 2, wherein the encapsulated valve includes biasing means to bias the valve pin towards the default, closed position.

4. Gas regulating means of claim 3, wherein a filter body is fitted to the inlet side of the valve body for filtering the gas flowing through the valve body.

5. Gas regulating means of claim 4, wherein the biasing means acts between the filter body proximate the inlet side and a seat holder.

6. Gas regulating means of claim 5, wherein the valve body defines an internal chamber to accommodate the seat holder, the biasing means and the filter body.

7. Gas regulating means of claim 1, wherein the valve body is substantially elongate, with the lever extending substantially transversely to the valve body.

8. Gas regulating means of claim 1, wherein the valve body further comprises two spaced apart walls, with the portion of the lever that is received in the encapsulated valve positioned between the two spaced apart walls.

9. Gas regulating means of claim 8, wherein the two spaced apart walls define a recess that accommodates the portion of the lever that is received in the encapsulated valve.

10. Gas regulating means of claim 9, wherein one of the spaced apart walls that is adjacent the recess is fitted with the pivot pin to enable the lever to be pivotally fitted to the encapsulated valve at the outlet side of the encapsulated valve.

* * * * *